US010222968B2

(12) United States Patent
Aoshima et al.

(10) Patent No.: US 10,222,968 B2
(45) Date of Patent: Mar. 5, 2019

(54) IMAGE DISPLAY CONTROL APPARATUS, IMAGE DISPLAY APPARATUS, NON-TRANSITORY COMPUTER READABLE MEDIUM, AND IMAGE DISPLAY CONTROL METHOD

(71) Applicant: FUJI XEROX CO., LTD., Tokyo (JP)

(72) Inventors: Yuzo Aoshima, Tokyo (JP); Yuki Okabe, Tokyo (JP); Chinatsu Hisamoto, Tokyo (JP); Yasushi Ichinowatari, Kanagawa (JP); Tomohito Takagi, Kanagawa (JP); Yu Mishima, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 282 days.

(21) Appl. No.: 14/806,748

(22) Filed: Jul. 23, 2015

(65) Prior Publication Data
US 2015/0324082 A1 Nov. 12, 2015

Related U.S. Application Data

(63) Continuation of application No. 13/859,213, filed on Apr. 9, 2013, now abandoned.

(30) Foreign Application Priority Data

Sep. 28, 2012 (JP) ................................ 2012-218679

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0482* (2013.01); *G06F 3/04883* (2013.01); *G06F 3/04886* (2013.01)

(58) Field of Classification Search
CPC ...................................... G06F 3/0481–3/0489
See application file for complete search history.

(56) References Cited

U.S. PATENT DOCUMENTS 6,002,401 A * 12/1999 Baker ............... G06F 17/30067
345/473
8,452,339 B2    5/2013 Lee et al.
(Continued)

FOREIGN PATENT DOCUMENTS

CN    101681218 A    3/2010
JP    8-221201 A    8/1996
(Continued)

OTHER PUBLICATIONS

Communication dated Feb. 21, 2017 from the Japanese Patent Office in counterpart Application No. 2015-227147.
(Continued)

*Primary Examiner* — Steven B Theriault
(74) *Attorney, Agent, or Firm* — Sughrue Mion, PLLC

(57) ABSTRACT

An image display control apparatus includes a display controller, a determination unit, and an execution unit. When an image displayed on a display having a display area and a touch panel disposed on the display area is specified through the touch panel, the display controller performs control to display menu screens individually representing predetermined plural menu items in such a manner that a free area is provided in part of a peripheral area adjacent to the image displayed in the display area. The determination unit determines that, when specification of the image through the touch panel is followed by movement of a specified position onto a desired menu screen, the menu item represented by the desired menu screen is specified, and determines that, when the specified position is moved to the
(Continued)

free area, a drag operation is specified. The execution unit executes a process corresponding to a determination result.

8 Claims, 12 Drawing Sheets

(51) Int. Cl.
*G06F 3/0482* (2013.01)
*G06F 3/0488* (2013.01)

(56) References Cited

U.S. PATENT DOCUMENTS

| | | | | |
|---|---|---|---|---|
| 8,739,058 | B2* | 5/2014 | Fisher | G06F 9/4443 715/779 |
| 8,881,061 | B2 | 11/2014 | Chaudhri et al. | |
| 9,122,947 | B2* | 9/2015 | Bowens | G06F 3/03547 |
| 2002/0054113 | A1* | 5/2002 | Conrad | G06F 3/0481 715/764 |
| 2002/0057292 | A1 | 5/2002 | Holtz | |
| 2003/0160825 | A1* | 8/2003 | Weber | G06F 3/0486 715/769 |
| 2004/0095390 | A1* | 5/2004 | Arning | G06F 3/0486 715/769 |
| 2004/0133544 | A1* | 7/2004 | Kiessig | G06F 17/30067 |
| 2004/0217990 | A1* | 11/2004 | Chen | G06F 3/0482 715/810 |
| 2005/0060653 | A1* | 3/2005 | Fukase | G06F 3/0486 715/724 |
| 2007/0150834 | A1* | 6/2007 | Muller | G06F 3/04817 715/810 |
| 2007/0198561 | A1* | 8/2007 | Lee | G06F 3/0483 |
| 2008/0307364 | A1* | 12/2008 | Chaudhri | G06F 3/0483 715/836 |
| 2008/0313538 | A1 | 12/2008 | Hudson | |
| 2009/0273571 | A1* | 11/2009 | Bowens | G06F 3/03547 345/173 |
| 2010/0058182 | A1* | 3/2010 | Jung | G06F 3/04817 715/702 |
| 2010/0083111 | A1* | 4/2010 | de los Reyes | G06F 3/0482 715/702 |
| 2010/0122194 | A1 | 5/2010 | Rogers | |
| 2010/0138763 | A1* | 6/2010 | Kim | G06F 1/1626 715/765 |
| 2010/0169828 | A1* | 7/2010 | Kho | G06F 9/4443 715/810 |
| 2010/0182248 | A1* | 7/2010 | Chun | G06F 3/041 345/173 |
| 2010/0275150 | A1* | 10/2010 | Chiba | G06F 3/0488 715/784 |
| 2010/0313124 | A1* | 12/2010 | Privault | G06F 3/0488 715/702 |
| 2011/0246918 | A1* | 10/2011 | Henderson | G06F 3/04817 715/769 |
| 2011/0252375 | A1* | 10/2011 | Chaudhri | G06F 3/04817 715/835 |
| 2011/0265043 | A1* | 10/2011 | Knitowski | G06F 3/04812 715/835 |
| 2012/0030623 | A1 | 2/2012 | Hoellwarlh | |
| 2013/0019182 | A1* | 1/2013 | Gil | G06F 3/0482 715/738 |
| 2013/0335358 | A1* | 12/2013 | Bowens | G06F 3/03547 345/173 |
| 2014/0096052 | A1 | 4/2014 | Aoshima et al. | |
| 2014/0201126 | A1* | 7/2014 | Zadeh | G06K 9/627 706/52 |
| 2016/0077734 | A1* | 3/2016 | Buxton | G06F 3/04842 715/773 |

FOREIGN PATENT DOCUMENTS

| | | |
|---|---|---|
| JP | 2011-13980 A | 1/2011 |
| JP | 2011-107823 A | 6/2011 |
| JP | 2012-508929 A | 4/2012 |
| WO | 2009/044770 A1 | 4/2009 |
| WO | 2011/152335 A1 | 12/2011 |

OTHER PUBLICATIONS

Communication dated Oct. 4, 2016 from the Japanese Patent Office in counterpart Application No. 2015-227147.
Communication dated Jul. 3, 2017, from the State Intellectual Property Office of People's Republic of China in counterpart Application No. 201310168346.8.

* cited by examiner

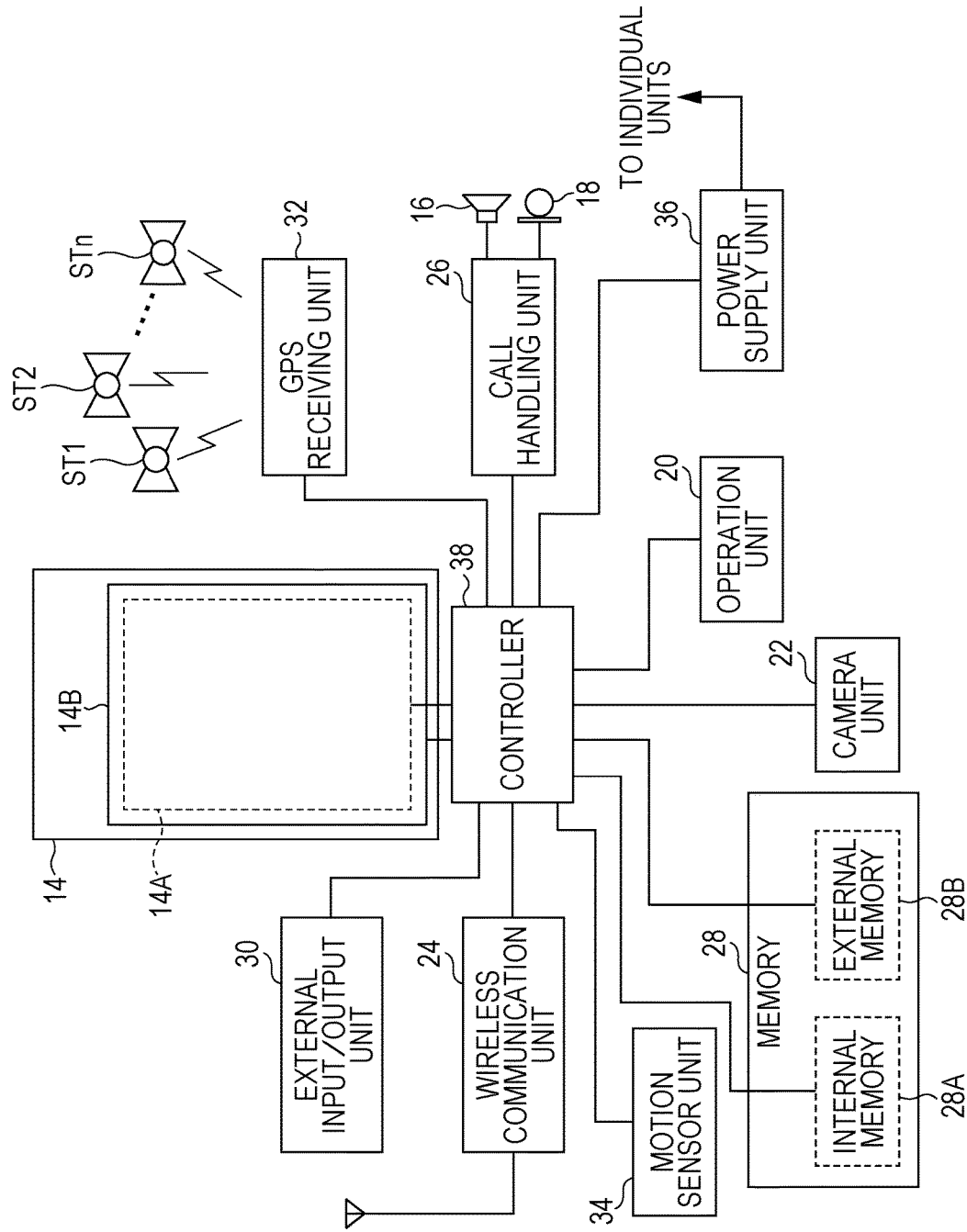

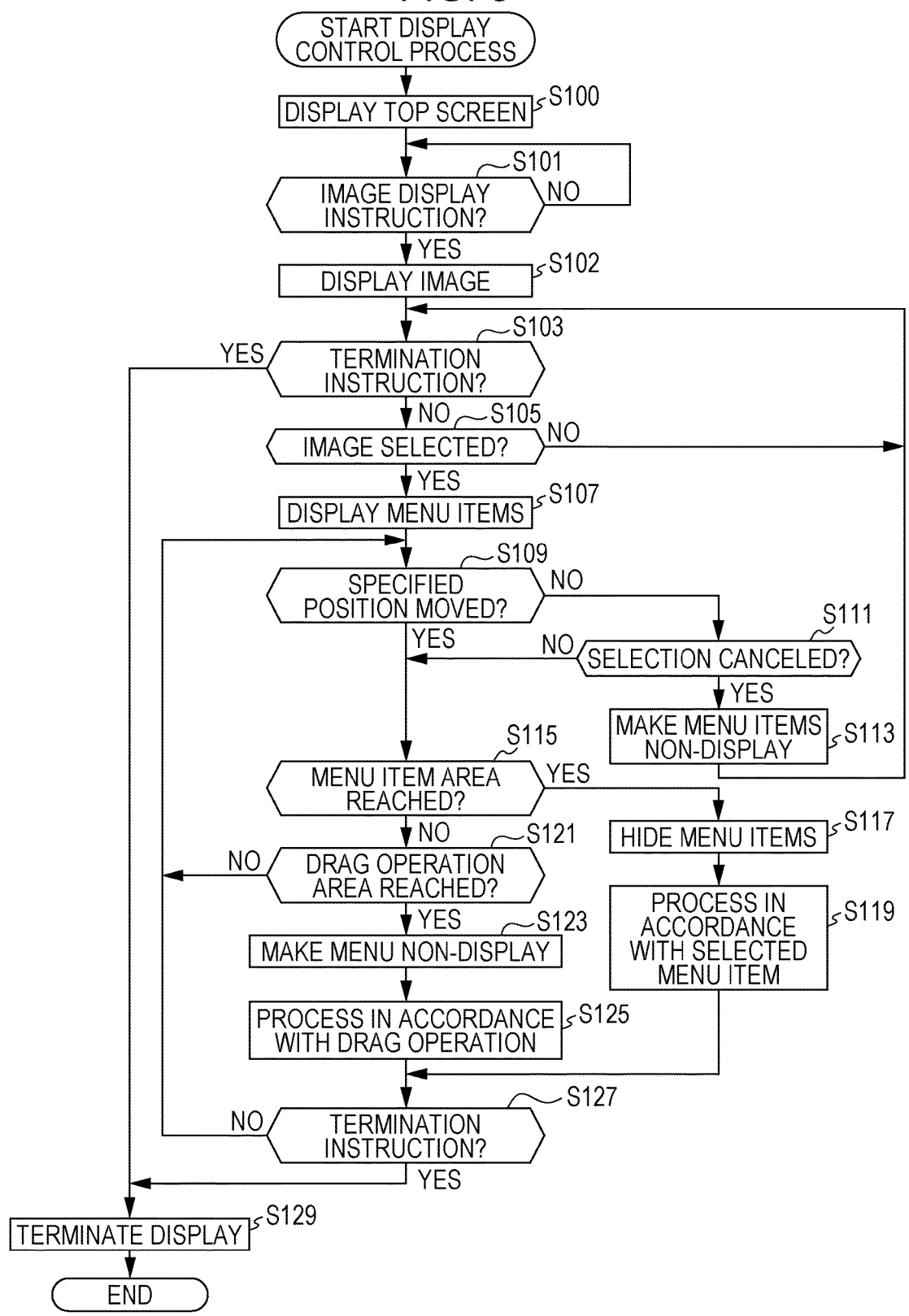

FIG. 8A
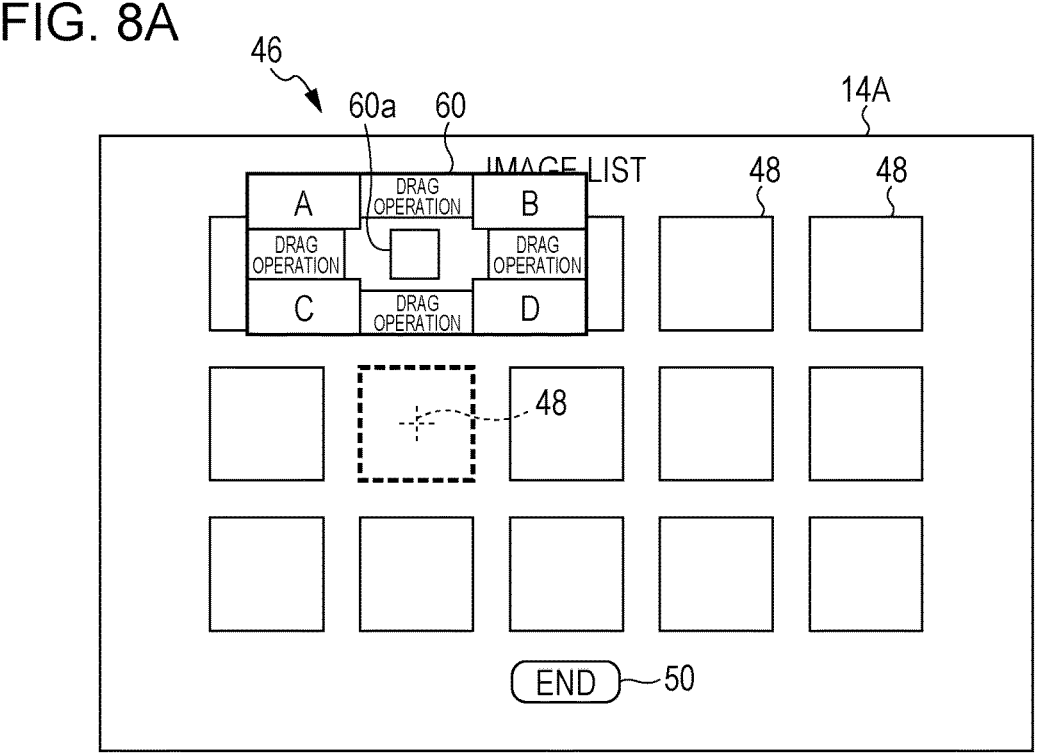
FIG. 8B
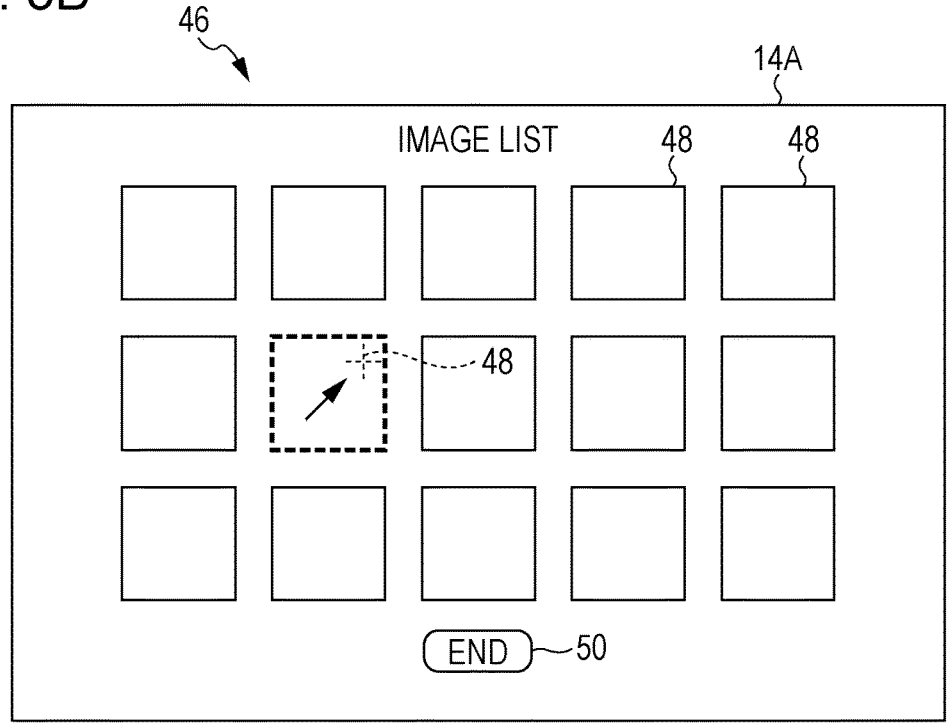

FIG. 9A
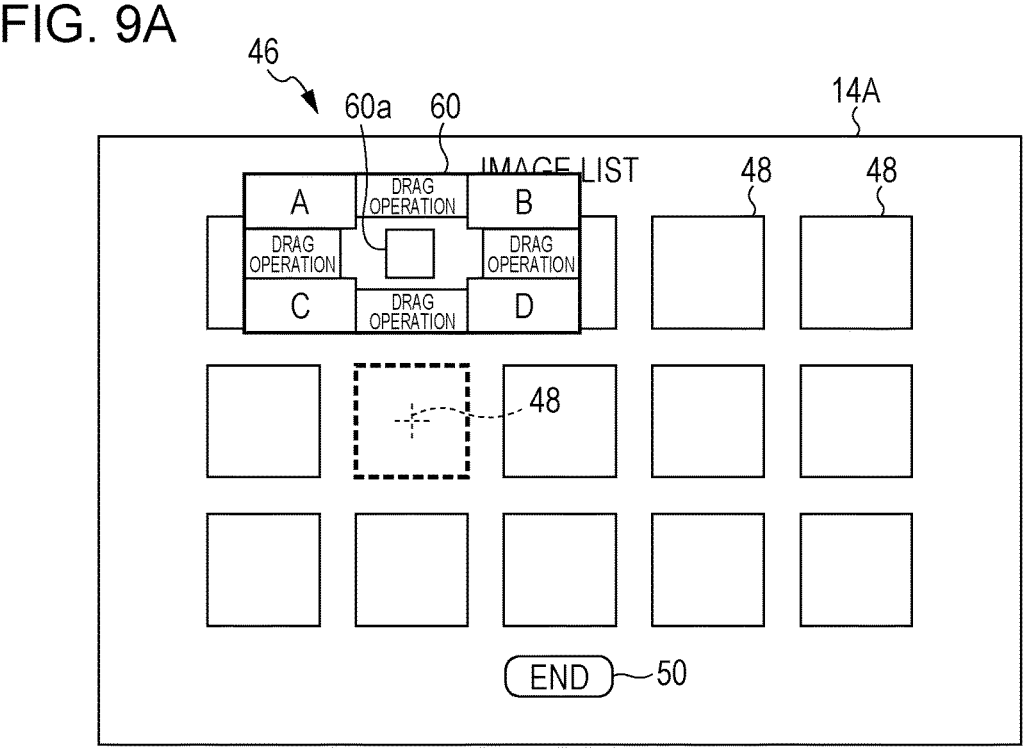
FIG. 9B
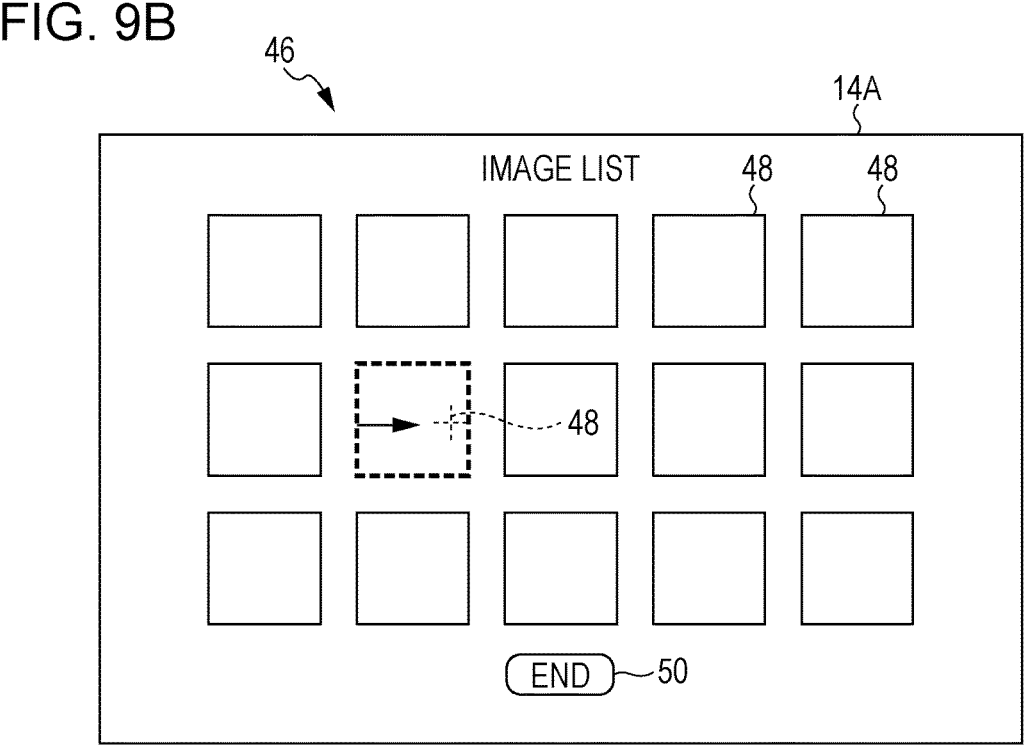

IMAGE DISPLAY CONTROL APPARATUS, IMAGE DISPLAY APPARATUS, NON-TRANSITORY COMPUTER READABLE MEDIUM, AND IMAGE DISPLAY CONTROL METHOD

CROSS-REFERENCE TO RELATED APPLICATIONS

This application is a continuation of U.S. application Ser. No. 13/859,213, filed on Apr. 9, 2013 which claims priority under 35 USC 119 from Japanese Patent Application No. 2012-218679 filed Sep. 28, 2012, the disclosures of which are incorporated herein by reference.

BACKGROUND (i) Technical Field

The present invention relates to an image display control apparatus, an image display apparatus, a non-transitory computer readable medium, and an image display control method. More specifically, the present invention relates to an image display control apparatus that receives an instruction for performing an operation on a displayed image, an image display apparatus including the image display control apparatus, a non-transitory computer readable medium storing a program executed by the image display control apparatus, and an image display control method for receiving an instruction for performing an operation on a displayed image.

(ii) Related Art

Recently, with the advance of mobile phone terminal apparatuses, multi-functional mobile phone terminal apparatuses having larger displays than existing feature phone terminal apparatuses, called smartphones, have been developed. Most smartphones having displays as large as possible do not have hardware keyboards, which are used in existing feature phone terminal apparatuses, in order to maintain the size of the smartphone housing small. Such smartphones include a hardware operation unit having a small number of operation buttons such as an on/off button, and a display which also serves as a touch panel so that the display is used as an operation tool.

In existing image display apparatuses, an operation of displaying menu items representing various processes in order to execute the various processes on a displayed image, followed by an operation of selecting one of the menu items, is generally performed by the user. In existing image display apparatuses, furthermore, the operation of dragging a displayed image is also performed by the user.

SUMMARY

According to an aspect of the invention, there is provided an image display control apparatus including a display controller, a determination unit, and an execution unit. The display controller performs control to display menu screens each representing one of predetermined plural menu items, individually in association with the menu items, when an image displayed on a display having a display area in which an image is displayed and a touch panel disposed on a surface of the display area is specified through the touch panel, in such a manner that a free area is provided in part of a peripheral area adjacent to the image displayed in the display area. The determination unit determines that, when specification of the image through the touch panel while the menu screens are being displayed in the display area is followed by movement of a specified position onto one of the menu screens, the menu item represented by the menu screen onto which the specified position is moved is specified, and determines that, when the specified position is moved to the free area, a drag operation of the specified image in accordance with movement of the specified position is specified. The execution unit executes a process corresponding to a determination result of the determination unit.

BRIEF DESCRIPTION OF THE DRAWINGS

An exemplary embodiment of the present invention will be described in detail based on the following figures, wherein:

FIG. 2 is a block diagram illustrating the configuration of the smartphone according to the exemplary embodiment;

FIG. 3 is a flowchart illustrating a processing procedure of a display control processing program according to the exemplary embodiment;

FIGS. 8A and 8B illustrate another example configuration of a screen displayed by the execution of the display control processing program according to the exemplary embodiment;

FIGS. 9A and 9B illustrate another example configuration of a screen displayed by the execution of the display control processing program according to the exemplary embodiment;

DETAILED DESCRIPTION

An exemplary embodiment of the present invention will be described in detail hereinafter with reference to the drawings. In the following exemplary embodiment, a smartphone will be described by way of non-limiting example. It is to be understood that the following exemplary embodiment may also apply to any other device having a display screen, such as a mobile phone, a personal digital assistant (PDA), or a portable game console.

Figure 1:
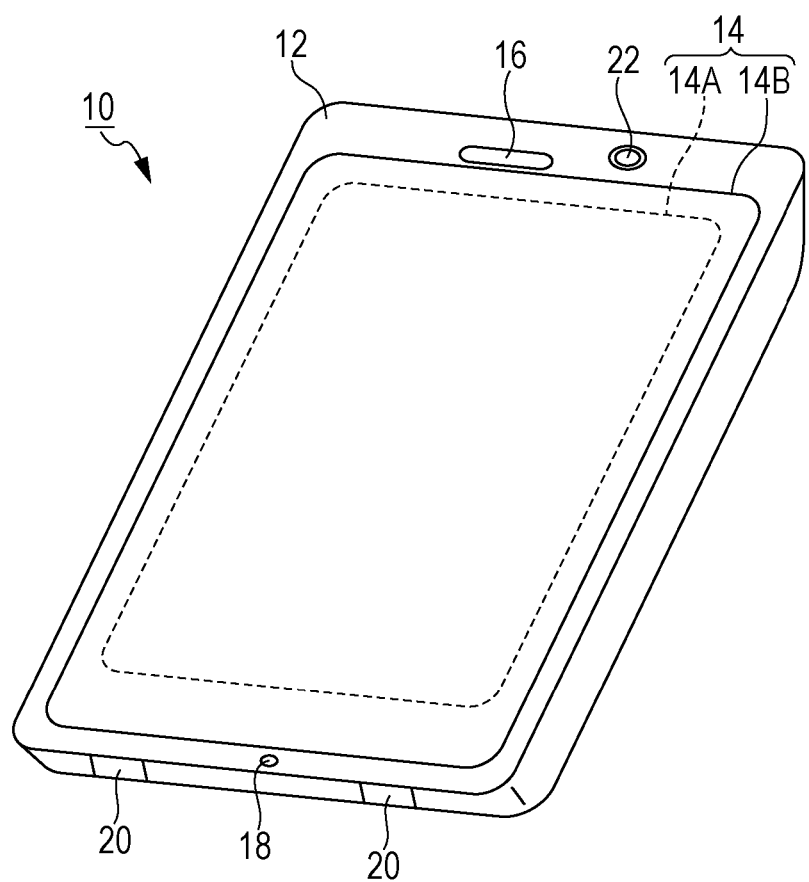
FIG. 1 is a perspective view illustrating the external appearance of a smartphone according to an exemplary embodiment.

FIG. 1 is a perspective view illustrating an external appearance of a smartphone 10 according to this exemplary embodiment. The smartphone 10 illustrated in FIG. 1 has a flat housing 12, and includes, on a surface of the housing 12, a display input unit 14 having a display panel 14A serving as a display and an operation panel 14B serving as an input unit. The display panel 14A and the operation panel 14B are formed into a single unit. The housing 12 includes a speaker 16, a microphone 18, operation units 20, and a camera unit 22. The configuration of the housing 12 is not limited to that described above, and, for example, a folding housing or a sliding housing may also be used.

FIG. 2 is a block diagram illustrating the configuration of the smartphone 10 according to this exemplary embodiment. As illustrated in FIG. 2, the smartphone 10 includes a wireless communication unit 24, the display input unit 14, a call handling unit 26, the operation unit 20, the camera unit 22, a memory 28, and an external input/output unit 30. The smartphone 10 further includes a global positioning system (GPS) receiving unit 32, a motion sensor unit 34, a power supply unit 36, and a controller 38. Further, the smartphone 10 has a wireless communication function for performing mobile wireless communication via a base station device and a mobile communication network.

The wireless communication unit 24 is configured to perform wireless communication with a base station device included in a mobile communication network in accordance with an instruction of the controller 38. Using the wireless communication, the wireless communication unit 24 transmits and receives various file data such as speech data and image data, electronic mail data, and the like, and receives web data, streaming data, and so forth.

The display input unit 14 may be a touch panel display that displays images (still images and moving images), text information, and so forth to visually present information to the user and that detects a user operation on the displayed information under control of the controller 38. The display input unit 14 includes the display panel 14A and the operation panel 14B.

The display panel 14A may employ a liquid crystal display (LCD), an organic electro-luminescence display (OELD), or the like as a display apparatus. The operation panel 14B is a device disposed to allow the user to visually recognize an image displayed on a display surface of the display panel 14A and configured to detect the coordinates of one or more operations made by user's fingertip or touch pen. When this device is operated with a user's fingertip or touch pen, a detection signal generated in accordance with the operation is output to the controller 38. The controller 38 then detects the position (coordinates) of the operation on the display panel 14A in accordance with the received detection signal.

The size of the display area may or may not exactly coincide with the size of the display panel 14A. Examples of the position detection method employed for the operation panel 14B may include a matrix switch method, a resistive method, a surface acoustic wave method, an infrared method, an electromagnetic induction method, and an electrostatic capacitive method, and any of them may be used.

The call handling unit 26 includes the speaker 16 and the microphone 18, and is configured to convert user speech input through the microphone 18 into speech data processable by the controller 38 and output the speech data to the controller 38, or decode speech data received by the wireless communication unit 24 or the external input/output unit 30 and output the decoded speech data from the speaker 16. For example, the speaker 16 may be disposed on the same surface as the surface on which the display input unit 14 is disposed in the manner illustrated in FIG. 1, and the microphone 18 may be disposed on a side surface of the housing 12.

The operation units 20 are configured to receive an instruction given by the user. For example, as illustrated in FIG. 1, the operation units 20 may push-button switches disposed on a side surface of the housing 12 of the smartphone 10 and turned on when pressed by finger or the like and turned off, when released, due to the restoring force of a spring or the like.

The memory 28 is configured to store control programs and control data of the controller 38, application software, address data including the name, telephone number, and so forth of the communication partner which are associated with one another, data of transmitted and received electronic mails, web data downloaded by web browsing, and downloaded content data and also temporarily store streaming data and the like. The memory 28 includes a built-in internal memory 28A of the smartphone 10 and a detachable external memory 28B having an external memory slot. Each of the internal memory 28A and the external memory 28B of the memory 28 may be implemented using any type of suitable storage medium including a flash memory type, a hard disk type, a multimedia card micro type, a memory card type (such as MicroSD (registered trademark) memory), a random access memory (RAM), and a read only memory (ROM).

The external input/output unit 30 serves as an interface with all the external devices connected to the smartphone 10, and is used for direct or indirect connection with other external devices via communication (e.g., universal serial bus (USB) or Institute of Electrical and Electronics Engineers (IEEE) 1394 communication) or a network (e.g., the Internet, wireless local area network (LAN), Bluetooth (registered trademark), radio frequency identification (RFID), infrared data association (IrDA) (registered trademark), ultra wideband (UWB) (registered trademark), or ZigBee (registered trademark)).

Examples of the external devices connected to the smartphone 10 include a wired/wireless headset, a wired/wireless external charger, a wired/wireless data port, a card connected through a card socket, such as a memory card, a subscriber identity module (SIM) card, or a user identity module (UIM) card, an external audio/video device connected through an audio/video input/output (I/O) terminal, an external audio/video device connected by a wireless link, a smartphone connected to a wired/wireless network, a personal computer connected to a wired/wireless network, a PDA connected to a wired/wireless network, and an earphone. The external input/output unit 30 may transmit data received from the external devices to the internal components of the smartphone 10 and transmit internal data of the smartphone 10 to the external devices.

The GPS receiving unit 32 receives GPS signals transmitted from GPS satellites ST1 to STn, and executes a position measurement calculation process based on the received plural GPS signals to detect the position (in latitude, longitude, and altitude) of the smartphone 10 in accordance with an instruction of the controller 38. If the GPS receiving unit 32 is allowed to acquire position information from the wireless communication unit 24 or the external input/output unit 30 (e.g., a wireless LAN), the GPS receiving unit 32 may detect the position of the smartphone 10 using the acquired position information.

The motion sensor unit 34 includes, for example, a three-axis acceleration sensor and so forth, and is configured to detect a physical movement of the smartphone 10 in accordance with an instruction of the controller 38. By detecting a physical movement of the smartphone 10, the motion sensor unit 34 may detect the movement direction and acceleration of the smartphone 10. The detection results are output to the controller 38.

The power supply unit 36 is configured to supply power stored in a battery (not illustrated) to the individual components of the smartphone 10 in accordance with an instruction of the controller 38.

The controller 38 includes a microprocessor, and is configured to operate in accordance with the control programs and control data stored in the memory 28 to collectively control the individual components of the smartphone 10. Further, the controller 38 has a mobile communication control function for controlling the individual units of a communication system and an application processing function in order to perform speech communication and data communication via the wireless communication unit 24.

The application processing function may be implemented by the operation of the controller 38 in accordance with the application software stored in the memory 28. Examples of the application processing function include an infrared communication function for controlling the external input/output unit 30 to perform data communication with a counterpart device, an electronic mail function for transmitting and receiving electronic mails, and a web browsing function for viewing web pages.

The controller 38 also has an image processing function for, for example, displaying video on the display input unit 14 based on image data (still image data or moving image data) such as received data or downloaded streaming data. The image processing function is a function in which the controller 38 decodes the image data and performs image processing on the decoded image data to display an image on the display input unit 14.

Further, the controller 38 executes display control for the display panel 14A and operation detection control for detecting a user operation through the operation units 20 and the operation panel 14B.

By executing the display control, the controller 38 displays an operation unit implemented in software, such as an icon to start the application software or a scroll bar, or displays a window for creating an electronic mail. The scroll bar is an operation unit implemented in software for receiving an instruction to move a displayed part of an image which is too large to be accommodated in the display area of the display panel 14A.

By executing the operation detection control, the controller 38 detects user operations made through the operation units 20, receives an operation on the icon described above or an input of a character string to an input field on the window described above through the operation panel 14B, or receives a request for scrolling a displayed image with the scroll bar.

By executing the operation detection control, furthermore, the controller 38 determines whether the position at which the operation panel 14B was operated is located in a superimposition part (display area) that overlaps the display panel 14A or in a non-superimposition, outer peripheral part (non-display area) that does not overlap the display panel 14A. The controller 38 has a touch panel control function for controlling a touch-sensitive area of the operation panel 14B and the displayed position of the operation unit implemented in software.

The controller 38 may also detect a gesture made to the operation panel 14B, and implement a preset function in accordance with the detected gesture. A gesture is not an existing simple touch but a more complex action such as rendering a trail of a finger or the like across the operation panel 14B, simultaneously specifying plural positions on the operation panel 14B, or a combination thereof to render a trail of the finger or the like regarding at least one of the plural positions.

The camera unit 22 may be a digital camera configured to electronically capture an image using an imaging element such as a complementary metal oxide semiconductor (CMOS) or charge-coupled device (CCD) sensor. The camera unit 22 is also configured to convert image data obtained by image capture into compressed image data such as JPEG (Joint Photographic Experts Group) image data under control of the controller 38, and record the resulting image data in the memory 28 or output the resulting image data through the external input/output unit 30 or the wireless communication unit 24. In the smartphone 10 illustrated in FIG. 1, the camera unit 22 is disposed on the same surface as the surface on which the display input unit 14 is disposed. Instead, the camera unit 22 may be disposed on the rear surface of the display input unit 14, or, alternatively, multiple camera units 22 may be disposed. If multiple camera units 22 are disposed, the camera units 22 may be used independently by switching from one to another to capture images, or the multiple camera units 22 may be used simultaneously to capture images.

The camera unit 22 may also be used for various functions of the smartphone 10. For example, an image captured with the camera unit 22 may be displayed on the display panel 14A, or an image obtained by the camera unit 22 may be used as an operation input tool of the operation panel 14B. Further, the GPS receiving unit 32 may refer to an image obtained by the camera unit 22 to detect a position. In addition, the optical axis direction of the camera unit 22 of the smartphone 10 may be determined or current use conditions may be determined by referring to an image obtained by the camera unit 22, without using the three-axis acceleration sensor or along with the three-axis acceleration sensor. An image obtained by the camera unit 22 may also be used in the application software.

Additionally, position information acquired by the GPS receiving unit 32, speech information (which may be subjected to speech-to-text conversion to obtain text information by using the controller 38 or the like) acquired by the microphone 18, attitude information acquired by the motion sensor unit 34, and any other desired information may be added to image data of a still image or a moving image, and the image data having such information may be recorded on the memory 28 or output through the external input/output unit 30 or the wireless communication unit 24.

In the smartphone 10 according to this exemplary embodiment, at least one of the internal memory 28A and the external memory 28B stores image information. When an instruction for displaying the image information in a list is given by user operation, the smartphone 10 performs control to display the list on the display panel 14A. In this case, the smartphone 10 executes various processes on the displayed image or executes a process for dragging the displayed image in accordance with a user operation.

The operation of the smartphone 10 according to this exemplary embodiment will be described with reference to FIG. 3. FIG. 3 is a flowchart illustrating a process of a display control processing program executed by the controller 38 of the smartphone 10 when an instruction for executing the process is input through the operation panel 14B or the operation unit 20. The program is stored in advance in a certain area of the internal memory 28A.

To avoid confusion, a description will be given of the case where plural pieces of image information are stored in the memory 28.

In step S100, the controller 38 performs control to display on the display panel 14A a top screen 42 from which a screen transition occurs.

Figure 4A:
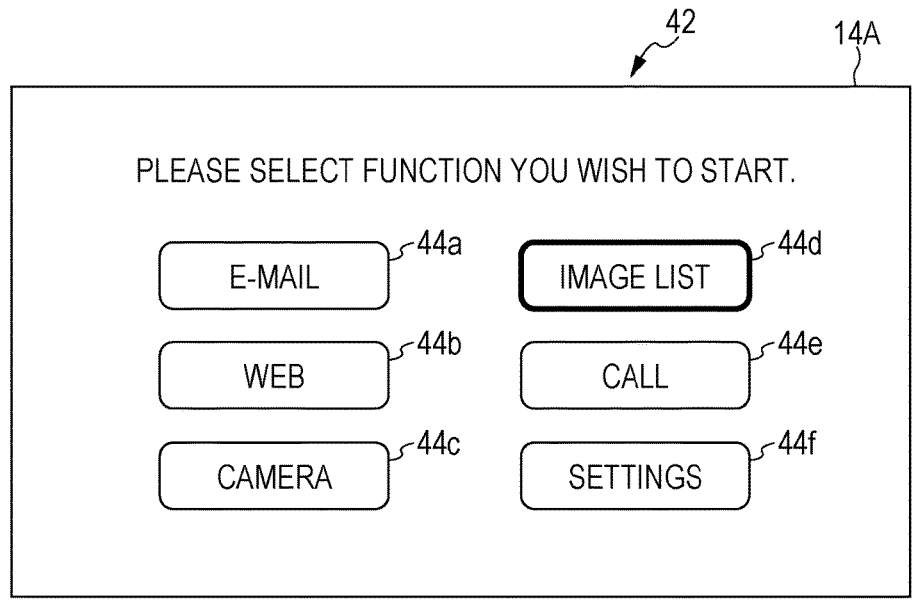
FIGS. 4A and 4B illustrate example configurations of a screen displayed by the execution of the display control processing program according to the exemplary embodiment.

FIG. 4A illustrates an example of the top screen 42 according to this exemplary embodiment. As illustrated in FIG. 4A, the top screen 42 has selection buttons. The selection buttons include, for example, an "e-mail" button 44a used to instruct start of the e-mail function, a "web" button 44b used to instruct start of the web browsing function, a "camera" button 44c used to instruct start of the camera function, an "image list" button 44d used to instruct start of the image list function, a "call" button 44e used to instruct start of the function of making a call, and a "settings" button 44f used to instruct start of various setting functions.

The user touches a desired one of the selection buttons on the top screen 42 to select the function to be started. The controller 38 starts any of the functions in accordance with the selection button selected by user operation.

In step 101, the process waits for the user to select a menu button. Then, in step 102, the controller 38 determines whether the menu button selected by the user is the "image list" button 44d or not. If NO is selected, the process proceeds to step S103. In step S103, the controller 38 executes the function corresponding to the selected menu button, and then the program ends. If YES is selected, the process proceeds to step S104.

In step S104, the controller 38 performs control to display on the display panel 14A a list view screen on which the plural images stored in the memory 28 are displayed in a list.

Figure 4B:
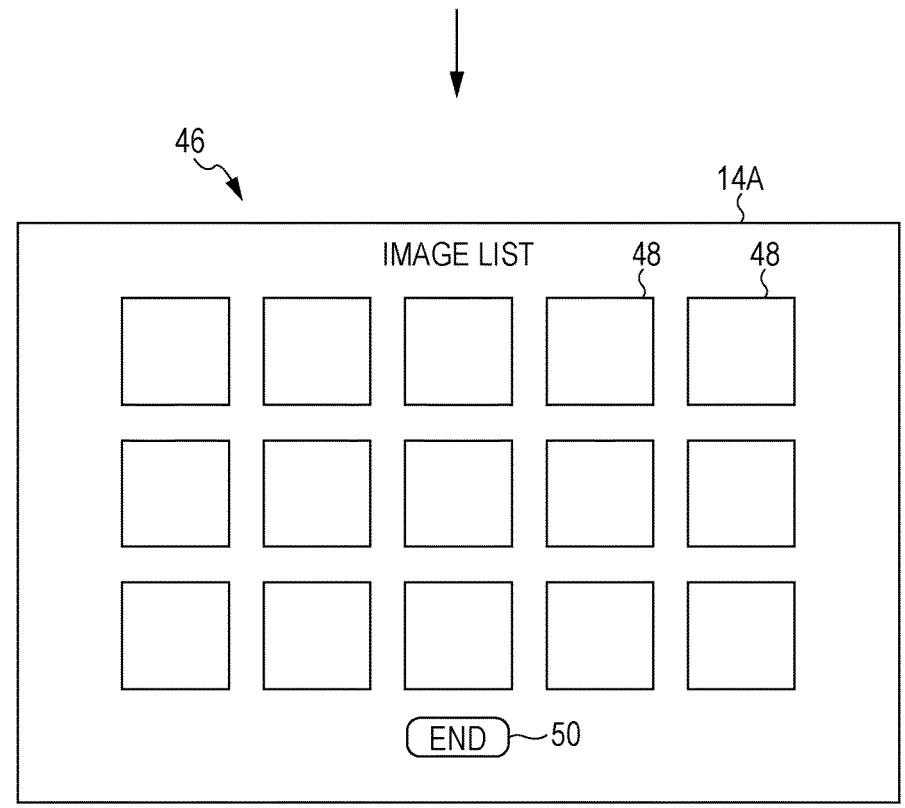

FIG. 4B illustrates an example of an image list screen 46 according to this exemplary embodiment. As illustrated in FIG. 4B, the image list screen 46 shows plural images 48 arranged in a matrix, and an "End" button 50 which is selected to terminate the display control processing program. The plural images 48 are images represented by the pieces of image information stored in the memory 28.

In step S105, the controller 38 determines whether or not an input operation has been made through the operation panel 14B.

If it is determined in step S105 that an input operation has been made, the process proceeds to step S106. In step S106, the controller 38 determines whether or not the touched button is the "End" button 50 to determine whether or not the input operation is an operation of inputting an instruction to terminate the display control processing program.

If it is determined in step S106 that the input operation is not an operation of inputting an instruction to terminate the display control processing program, the process proceeds to step S107. In step S107, the controller 38 determines whether or not the input operation is an input operation for selecting an image. If it is determined in step S107 that the input operation is not an input operation for selecting an image, the process returns to step S105.

If it is determined in step S107 that an input operation for selecting an image has been performed, the process proceeds to step S108. In step S108, the controller 38 performs control to display a menu screen 52 including plural predetermined menu items on the display panel 14A. In this exemplary embodiment, the menu items represent a process for duplicating image information, a process for deleting image information, a process for performing settings on image information, and a process for performing image processing on image information using an image processing program (not illustrated).

Figure 5A:
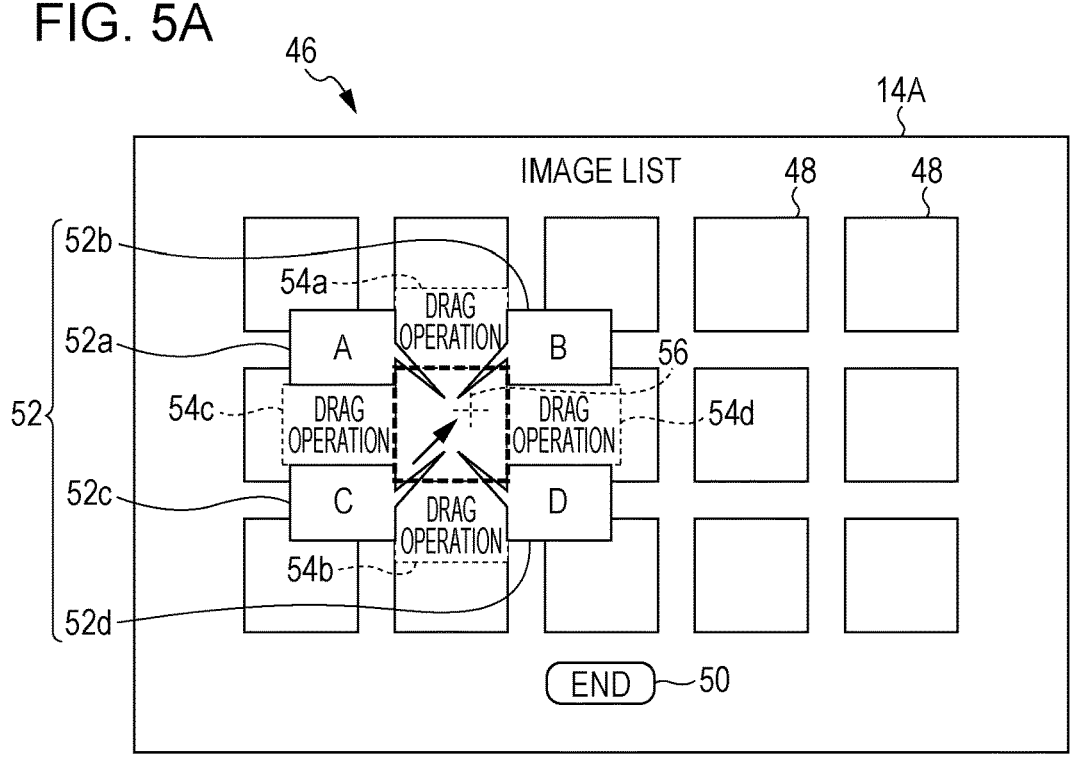
FIGS. 5A and 5B illustrate example configurations of a screen displayed by the execution of the display control processing program according to the exemplary embodiment.
Figure 5B:
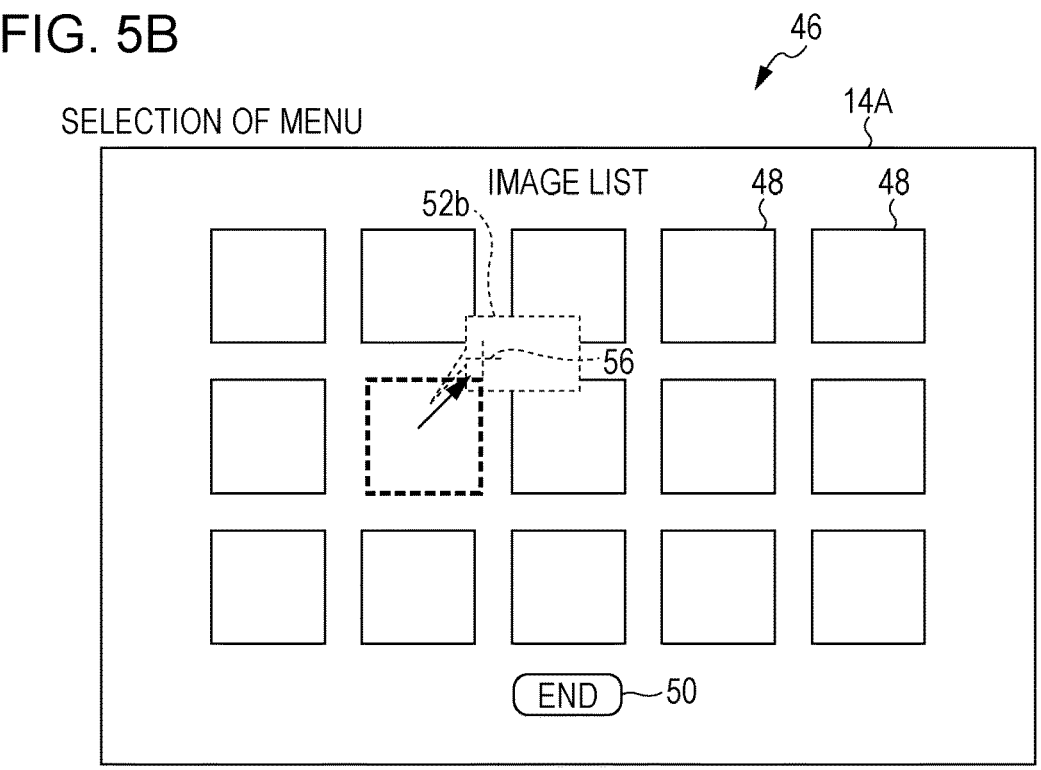

FIGS. 5A and 5B illustrate an example of the image list screen 46 according to this exemplary embodiment. As illustrated in FIG. 5A, when one of the plural images 48 displayed on the image list screen 46 is selected, the menu screen 52 is displayed so as to be superimposed on the image list screen 46. As illustrated in FIG. 5A, furthermore, in this exemplary embodiment, the menu screen 52 includes menu item selection parts 52a to 52d as areas for selecting one of the four menu items, namely, a menu item A, a menu item B, a menu item C, and a menu item D. Each of the menu item selection parts 52a to 52d is displayed so as to have a free area in part of a peripheral area adjacent to a selected image. Portions of the free areas which are adjacent to a selected image are represented by drag instruction areas 54a to 54d for indicating a drag operation.

In this exemplary embodiment, areas located on both sides of a selected image, which are adjacent to the selected image in the column direction (the up-down direction in front view of the display panel 14A) and row direction (the right-left direction in front view of the display panel 14A) of the plural images 48, are used as free areas. That is, when the menu item selection parts 52a to 52d are being displayed on the image list screen 46, the drag instruction areas 54a to 54d are located above, below, left, and right in front view with respect to the selected image, respectively.

The user may wish to drag any of images displayed in the image list screen 46 in order to, for example, change the display position of the image. In this exemplary embodiment, as described above, since the drag instruction areas 54a to 54d are located in the column direction or row direction of the selected image, the operation of instructing the drag operation may be seamlessly followed by the drag operation.

Then, in step S109, the controller 38 determines whether or not a position specified by the user with his or her fingertip has continuously been moved on the operation panel 14B. For example, if the specified position has been moved a predetermined distance (predetermined number of pixels) or more, the controller 38 determines that the specified position has been moved.

If it is determined in step S109 that the specified position has not been moved, the process proceeds to step S111. In step S111, the controller 38 determines whether or not the selection of an image by the user has been canceled. If the operation panel 14B does not output a detection signal generated due to the user operation such as releasing of the user's fingertip from the operation panel 14B, the controller 38 determines that the selection of an image has been canceled.

If it is determined in step S111 that the selection of an image has been canceled, the process proceeds to step S113. In step S113, the display of the menu item selection parts 52a to 52d displayed in step S107 is terminated, and then the process returns to step S103.

If it is determined in step S111 that the selection of an image has not been canceled, the process proceeds to step S115. In step S115, the controller 38 determines whether or not the position specified with the user's fingertip has reached any of the areas where the menu item selection parts 52a to 52d are being displayed. If the specified position is located in one of the display areas of the menu item selection parts 52a to 52d, the controller 38 determines that the specified position has reached any one of the areas where the menu item selection parts 52a to 52d are being displayed.

If it is determined in step S115 that the specified position has reached any one of the areas of the menu item selection parts 52a to 52d, the process proceeds to step S117. In step S117, the controller 38 terminates the display of the menu item selection parts 52a to 52d displayed in step S107. Then, in step S119, the controller 38 executes a process corresponding to one of the menu item selection parts 52a to 52d corresponding to the area that the position specified with the user's fingertip has reached.

In this manner, the user touches the display area of an image on which the user wishes to execute the desired process through the operation panel 14B to specify the image. The user further moves the image to the area corresponding to the desired process among the display areas of the menu item selection parts 52a to 52d displayed adjacent to the image. This allows the user to easily execute the desired process on the desired image.

As illustrated in FIG. 5A, the specified position is moved in accordance with the movement of the user's fingertip. As illustrated in FIG. 5B, when the specified position is located in the display area of the menu item selection part 52b of the "menu B", the process corresponding to the selection of the "menu B" is performed.

If it is determined in step S115 that the specified position has not reached any of the areas where the menu item selection parts 52a to 52d are being displayed, the process proceeds to step S121. In step S121, the controller 38 determines whether or not the position specified with the user's fingertip has reached one of the drag instruction areas 54a to 54d.

If it is determined in step S121 that the specified position has reached one of the drag instruction areas 54a to 54d, the process proceeds to step S123. In step S123, the controller 38 terminates the display of the menu item selection parts 52a to 52d displayed in step S107. Then, in step S125, the controller 38 performs a drag operation in accordance with the movement of the selected image.

Figure 6A:
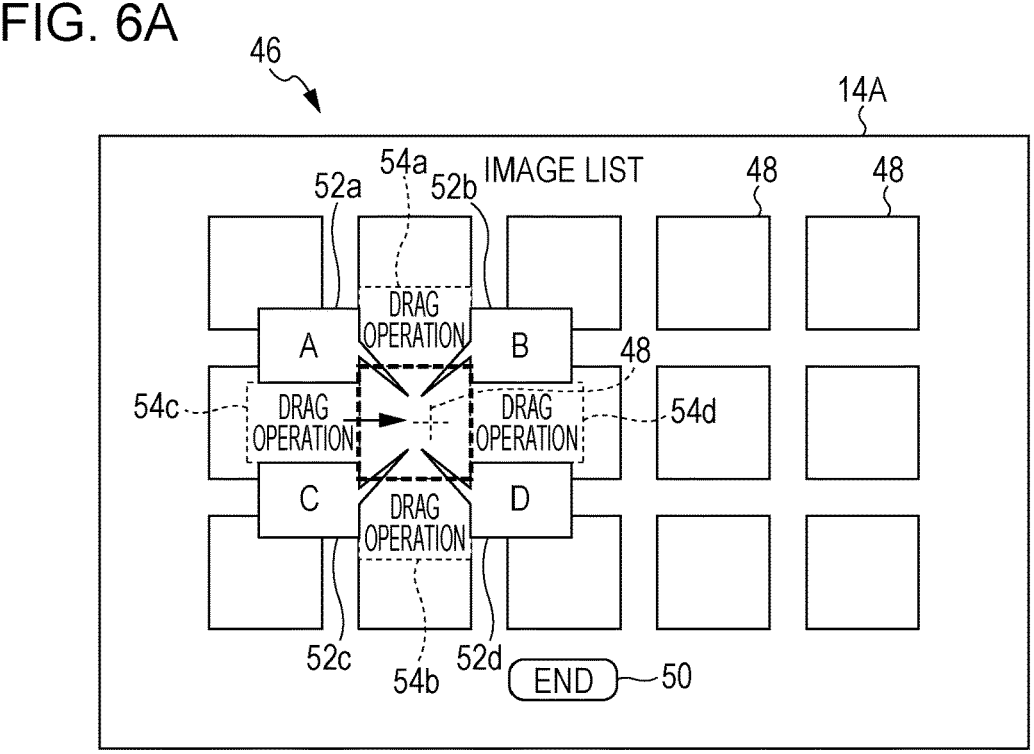
FIGS. 6A and 6B illustrate example configurations of a screen displayed by the execution of the display control processing program according to the exemplary embodiment.
Figure 6B:
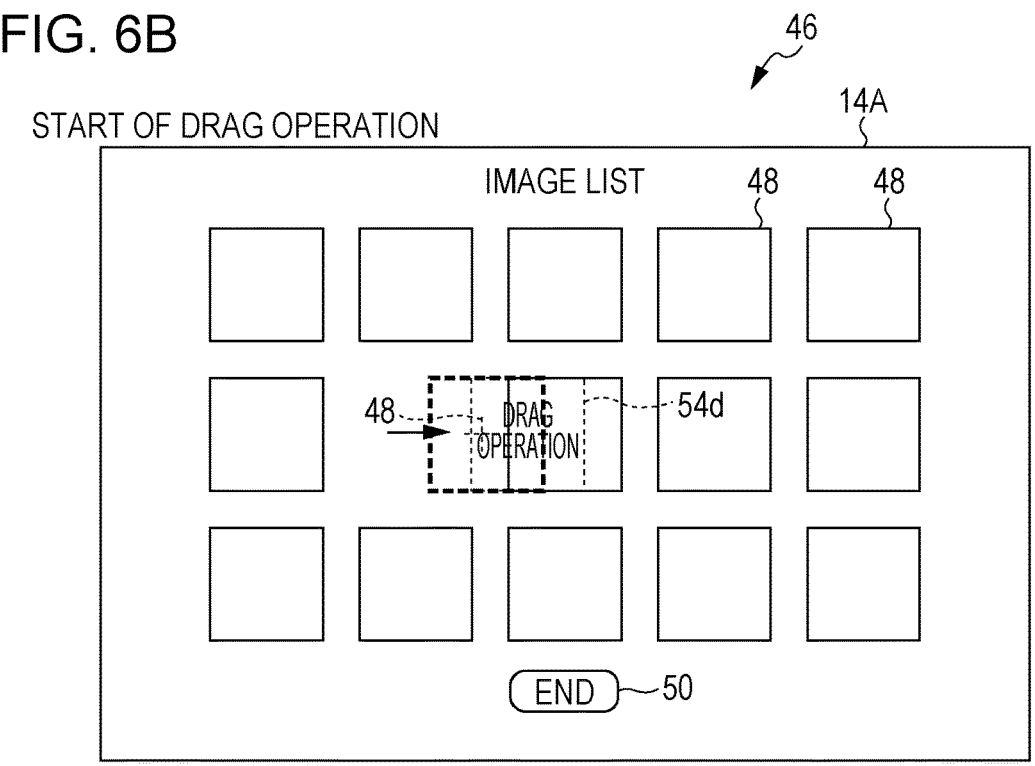

As illustrated in FIG. 6A, the specified position on the operation panel 14B is moved in accordance with the movement of the user's fingertip. As illustrated in FIG. 6B, the specified position is located in the drag instruction area 54d to the right in front view. In this case, the display of the menu item selection parts 52a to 52d is terminated. Then, the process corresponding to the drag operation is executed.

Figure 7A:
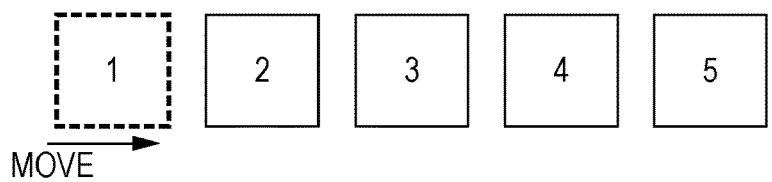
FIGS. 7A to 7G illustrate a process corresponding to a drag operation according to the exemplary embodiment.
Figure 7B:
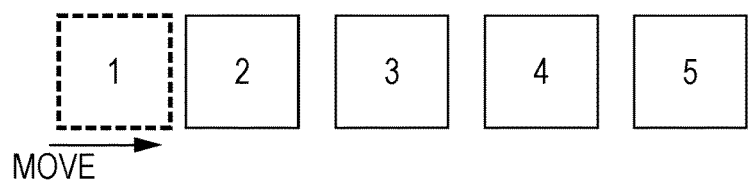
Figure 7C:
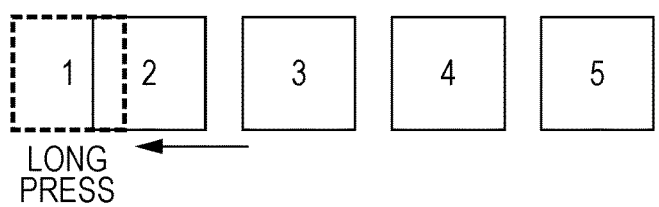
Figure 7D:
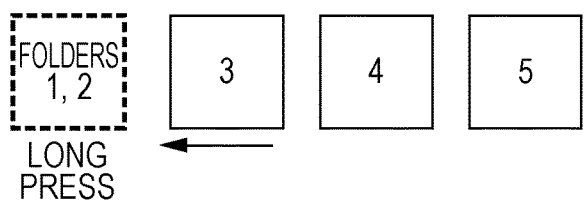

FIGS. 7A to 7F are schematic diagrams illustrating an example of the process corresponding to a drag operation according to this exemplary embodiment. For example, as illustrated in FIGS. 7A and 7B, when the first to fifth images are displayed in a line, the first image is specified as the image to be dragged by user operation, and is moved in the direction in which the second to fifth images exist (to the right in front view). In this case, as illustrated in FIG. 7C, when the first image is continuously specified (the first image is long pressed) while the first image and the second image overlap, the controller 38 determines that an instruction for integrating the first image and the second image has been issued, and integrates the first image and the second image. In this case, for example, as illustrated in FIG. 7D, a new folder is created at the position where the first image is located, and the first image and the second image are stored in the created folder.

Figure 7E:
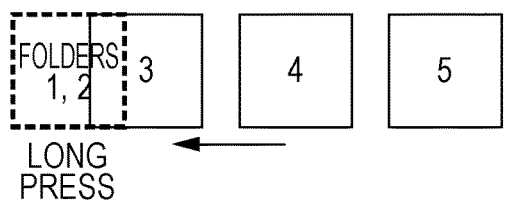
Figure 7F:
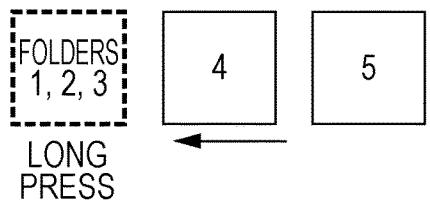
Figure 7G:
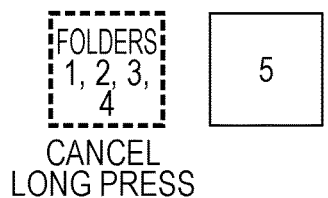

Thereafter, as illustrated in FIGS. 7E and 7F, when the first image is further continuously specified (the first image is long pressed), the third image and the fourth image are sequentially integrated. Then, as illustrated in FIG. 7G, when images up to the fourth image are integrated, the first image is stopped from being specified (being long pressed). Then, the integration (images are saved in the same folder) is terminated when the first to fourth images are integrated in the created folder.

Accordingly, the user touches the display area of a desired image through the operation panel 14B to specify the image, and moves his or her finger to any of the drag instruction areas 54a to 54d adjacent to the specified image. This allows the user to easily execute the process corresponding to the drag operation of the specified image.

In step S127, the controller 38 determines whether or not the touched button is the "End" button 50 to determine whether or not an operation of inputting an instruction to terminate the display control processing program has been performed.

If it is determined in step S127 that an operation of inputting an instruction to terminate the display control processing program has not been performed, the process returns to step S109.

If it is determined in step S103 or S127 that an operation of inputting an instruction to terminate the display control processing program has been performed, the process proceeds to step S129. In step S129, the controller 38 performs control to terminate the display of the image list screen 46, and then terminates the display control processing program.

In this manner, the smartphone 10 is configured such that an image displayed on the display panel 14A, which is a display having a display area in which an image is displayed and the operation panel 14B, which may be a touch panel, disposed on a surface of the display area, is specified through the touch panel. In this case, menu screens each representing one of predetermined plural menu items are displayed in association with the individual menu items in such a manner that a free area is provided in part of a peripheral area adjacent to the image displayed in the display area. Further, when specification of the image through the touch panel while the menu screens are being displayed in the display area is followed by movement of a specified position onto one of the menu screens, it is determined that the menu item represented by the menu screen onto which the specified position is moved is specified. If the specified position is moved to the free area, it is determined that a drag operation of the specified image in accordance with movement of the specified position is specified. Then, a process corresponding to a determination result is executed.

Further, part of a peripheral area adjacent to an image is used as a free area, thus preventing a user's finger from unintentionally releasing from the touch panel when moving over the touch panel and preventing an execution instruction from being regarded as being input to the mobile terminal apparatus at a position where the finger is released. That is, a menu operation may be prevented from being unintentionally executed.

In this exemplary embodiment, a menu screen is displayed around a selected image. However, the present invention is not limited to this exemplary embodiment. A menu screen indicating a movement direction for indicating each menu item may be displayed at a position that does not overlap a selected image in the display area on the display panel 14A.

FIGS. 8A and 8B and FIGS. 9A and 9B illustrate other examples of the image list screen 46 according to this exemplary embodiment. In this case, when an image is displayed on the image list screen 46 by user operation, by way of example, as illustrated in FIG. 8A, the smartphone 10 displays a menu screen 60 above the selected image in front view. A reference image position 60a indicating the position of the selected image is displayed at the center on the menu screen 60 to indicate in which direction the specified position is moved with respect to the reference image position 60a and also indicate which process is to be executed.

The user moves the specified position on the menu screen 60 in the direction in which the menu B is located (diagonally to the upper right in front view) in the manner illustrated in FIG. 8B while referring to the menu screen 60. In this case, the controller 38 executes the process corresponding to the menu B.

In contrast, the user moves the specified position on the menu screen 60 in the direction in which the drag operation is performed (to the right in front view) a predetermined distance or more in the manner illustrated in FIG. 9B while referring to the menu screen 60 illustrated in FIG. 9A. In this case, the controller 38 executes the process corresponding to the drag operation.

Figure 10:
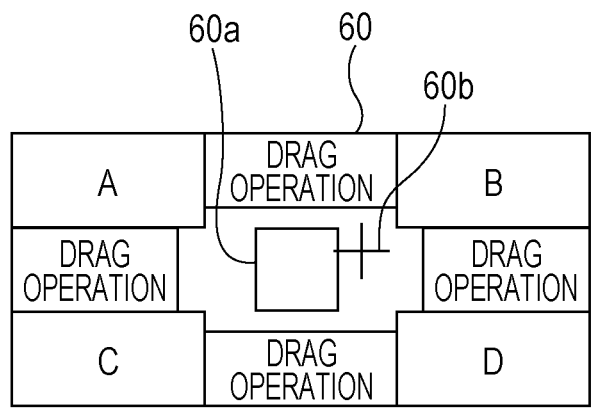
FIG. 10 illustrates an example of a menu screen according to the exemplary embodiment.

When the user is moving the specified position over the operation panel 14B while referring to the menu screen 60, as illustrated in FIG. 10, reference position information 60b indicating a specified position may be displayed on the menu screen 60 while being moved in accordance with the movement of the specified position. This allows the user to instruct the execution of the process corresponding to the menu item or the process corresponding to the drag operation while checking the position of the reference position information 60b on the menu screen 60.

In this exemplary embodiment, menu items are displayed as balloons around a selected image, which is non-limiting. A menu screen indicating a movement direction for indicating each menu item may be displayed in an arc around a selected image in the display area on the display panel 14A.

Figure 11:
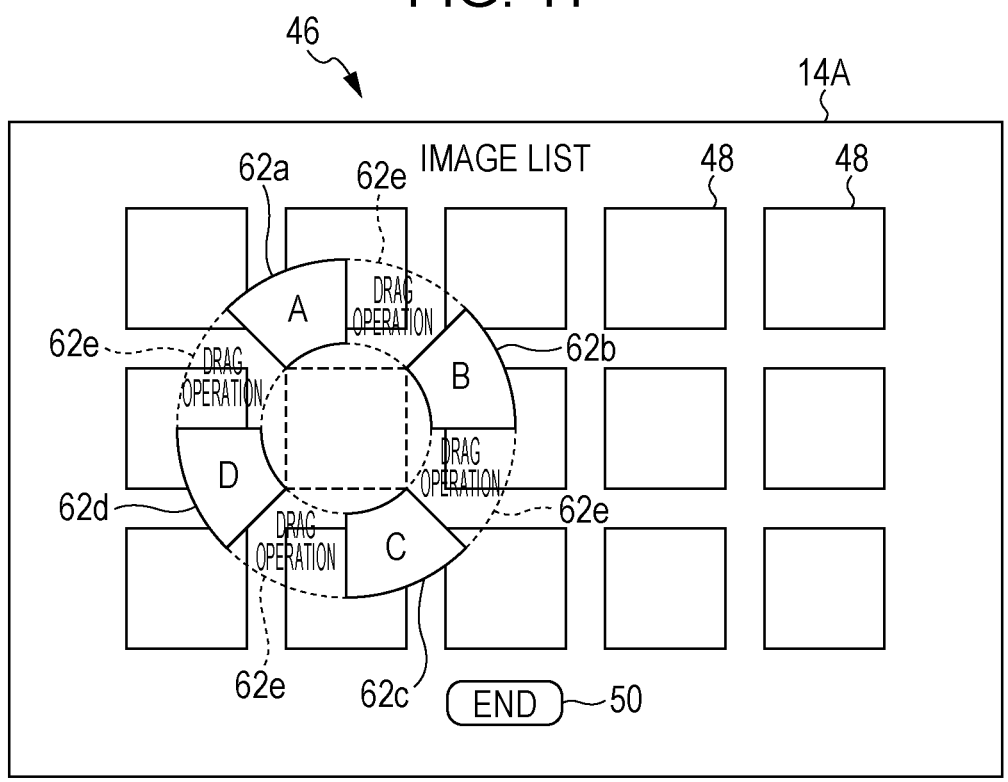
FIG. 11 illustrates another example configuration of a screen displayed by the execution of the display control processing program according to the exemplary embodiment.

FIG. 11 illustrates another example of the image list screen 46 according to this exemplary embodiment. When an image is selected on the image list screen 46 by user operation, by way of example, as illustrated in FIG. 11, the smartphone 10 may display menu screens in a circular area centered on a specified position or on the center of a selected image. In this case, menu item selection parts 62a to 62d may be displayed in some of angular sub-areas of the circular area. The other angular sub-areas of the circular area are used as free areas, and the free areas are used as areas 62e for indicating a drag operation.

In this exemplary embodiment, furthermore, menu items are displayed as balloons around a selected image, which is non-limiting. If less than four menu items are displayed in the display area on the display panel 14A, the menu items may be displayed in areas adjacent to a selected image among plural images arranged in an array in the row direction or the column direction. In this case, areas that are adjacent to a selected image among plural images arranged in an array in the row direction or the column direction and that are areas where the menu items are not displayed may be used as free areas, and the free areas may be used as areas for indicating a drag operation.

Figure 12A:
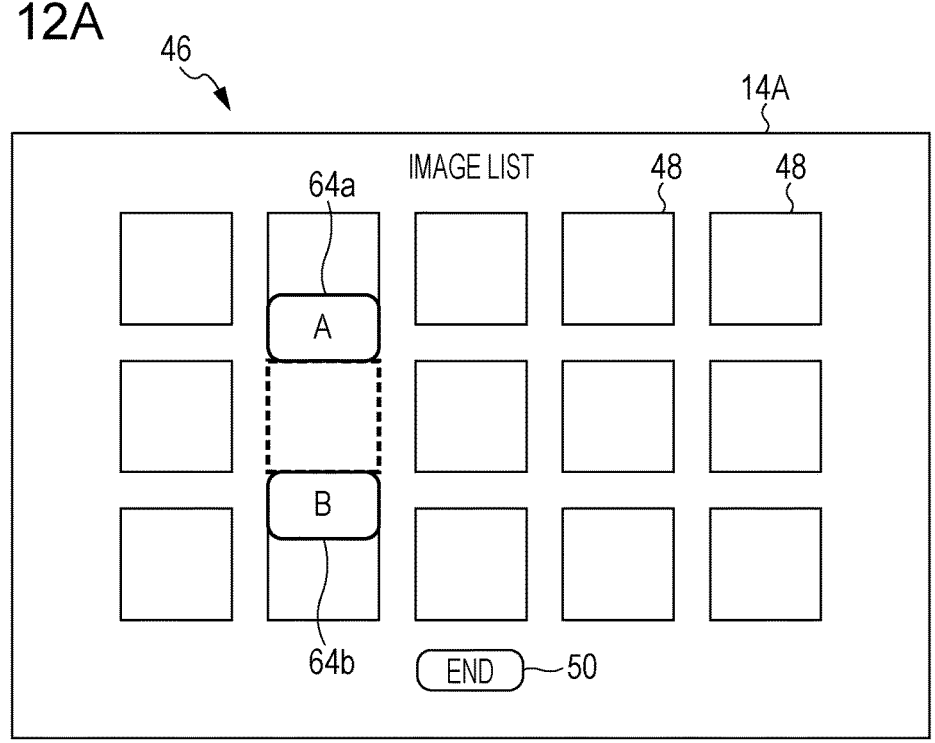
FIGS. 12A and 12B illustrate another example configuration of a screen displayed by the execution of the display control processing program according to the exemplary embodiment.
Figure 12B:
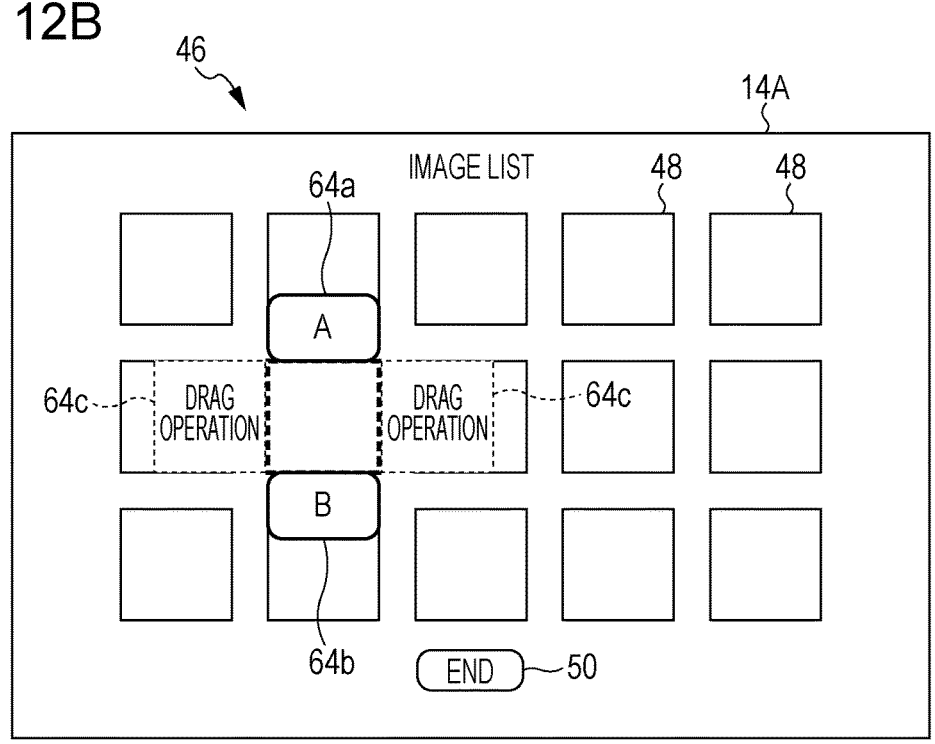

FIGS. 12A and 12B illustrate another example of the image list screen 46 according to this exemplary embodiment. For example, if two menu items are displayed, as illustrated in FIG. 12A, menu item selection parts 64a and 64b are displayed in areas above and below a selected image in front view. In this case, areas located on the left and right sides of the selected image in front view may be used as free areas, and the free areas may be used as areas 64c for indicating a drag operation.

In this exemplary embodiment, furthermore, various processes are executed when a specified position has been moved to an area for indicating a menu item or a drag operation, which is non-limiting. When an image is selected by user operation, it is temporarily assumed that an instruction for initiating a drag operation has been issued, and a process corresponding to the drag operation, such as moving the display position of the selected image in accordance with the movement of the specified position, is performed. Then, when the display position of the selected image has been moved to an area for indicating a menu item or a drag operation, various processes may be executed.

Figure 13A:
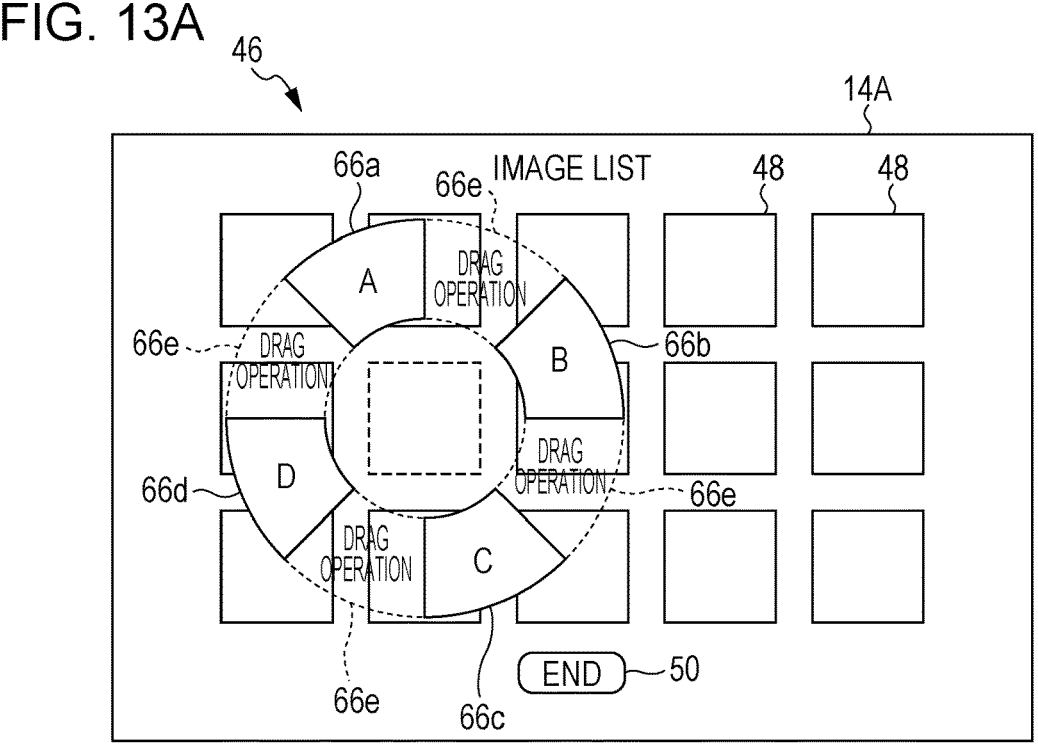
FIGS. 13A and 13B illustrate another example configuration of a screen displayed by the execution of the display control processing program according to the exemplary embodiment.
Figure 13B:
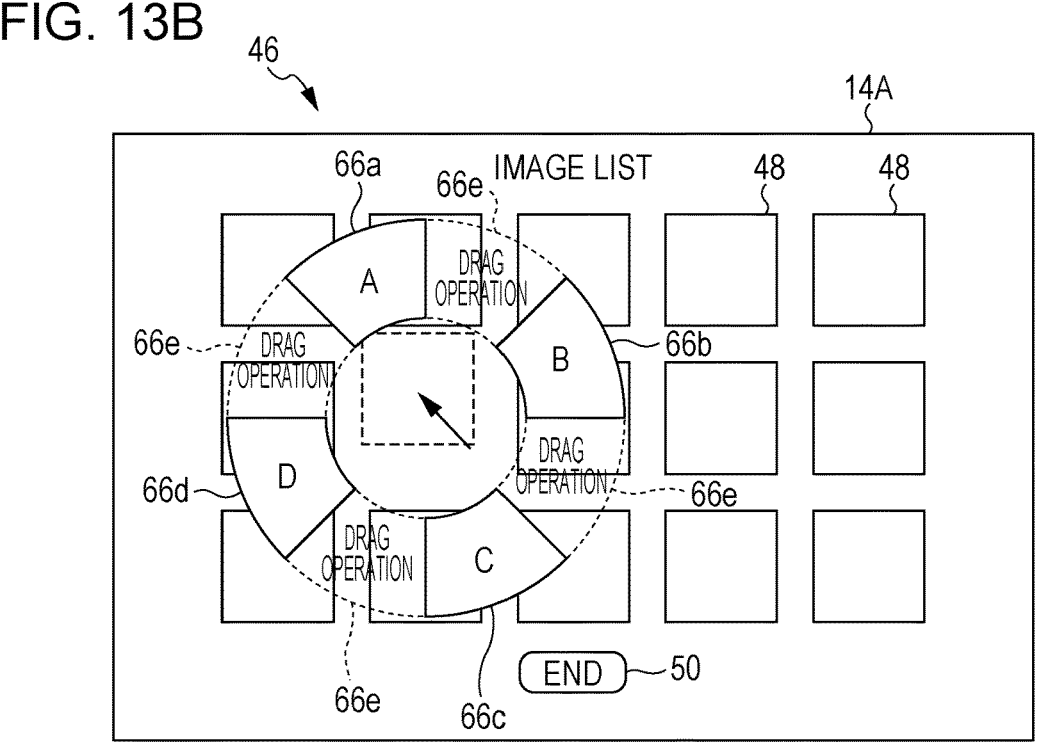

FIGS. 13A and 13B illustrate another example of the image list screen 46 according to this exemplary embodiment. When an image is selected on the image list screen 46 by user operation, the smartphone 10 displays menu item selection parts 66a to 66d in an area surrounding the selected image. For example, as illustrated in FIG. 13A, the smartphone 10 displays the menu item selection parts 66a to 66d in some of angular sub-areas of a circular area centered on the selected image. The other angular sub-areas of the circular area are used as free areas, and the free areas are used as areas 66e for indicating a drag operation.

If the display position of the selected image has reached any of the menu item selection parts 66a to 66d by user operation, the smartphone 10 stops the display of the menu item selection parts 66a to 66d, and executes the process corresponding to the menu item. If the display position of the selected image has reached any of the areas 66e for indicating a drag operation, on the other hand, the smartphone 10 stops the display of the menu item selection parts 66a to 66d, and executes the process corresponding to the drag operation.

As illustrated in FIG. 13B, for example, if the display position of the selected image has reached the menu item selection part 66a of the "menu A", the process corresponding to the drag operation is stopped, and the process corresponding to the menu A is executed. If the display position of the selected image has reached any of the areas 66e for indicating a drag operation, on the other hand, the display of the menu item selection parts 66a to 66d is stopped, and the drag operation is continued.

The determination as to whether or not the display position of the selected image has reached each area may be based on the determination as to whether or not part of a selected image is located in the area. This determination method is non-limiting, and it may be determined that display position of the selected image has reached each area when a portion of the selected image having a predetermined size or more is located in the area.

While the foregoing exemplary embodiment is implemented by software executed by a computer program, the present invention is not limited to the foregoing exemplary embodiment. It is to be understood that some exemplary embodiments of the present invention may be implemented only by hardware or by a combination of hardware and software.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display control apparatus comprising:
a memory comprising computer executable instructions;
a processor configured to read and execute the computer executable instructions, the computer executable instructions causing the processor to:
detect an input operation at a first image of a plurality of images displayed on a display, the input operation comprising:
  a first operation, which is a drag gesture, configured to move the first image towards a second image of the plurality of images in a first direction until the first image overlaps the second image, and integrate the first image and the second image in response to detecting that the overlap of the first image and the second image is for a first period of time, to form a merged folder, which includes both the first image and the second image, and
  a second operation, which is a long press selection, detected at the merged folder and configured to sequentially move a third image and a fourth image, among the plurality of images, towards the merged folder in a second direction opposite to the first direction,
wherein the first image, the second image, the third image and the fourth image are displayed in a row on the display,
wherein the long press selection is detected when the merged folder remains touched for a second period of time continuously and uninterrupted from the first period of time at the same position at which the merged folder is formed where overlap of the first image and the second image was detected,
wherein the sequential movement of the third and the fourth images toward the merged folder continues as long as the long pressing selection continues, and
wherein the third image is merged into the merged folder and thereafter the fourth image is merged into the merged folder in sequential order, if the long pressing selection continues until the third image and the fourth image have overlapped the merged folder, such that the merged folder contains all the first, second, third and fourth images after the long press selection.

2. The image display control apparatus according to claim 1, wherein the input at the first image comprises a touch input.

3. The image display control apparatus according to claim 1, wherein the drag gesture further comprises a touch input.

4. The image display control apparatus according to claim 1, further comprising a touch display configured to display the plurality of images.

5. An image display control method comprising:
detecting, by a processor, an input operation at a first image of a plurality of images displayed on a display, the input operation comprising:
  a first operation, which is a drag gesture, which causes the processor to move the first image towards a second image of the plurality of images in a first direction, and integrate the first image and the second image, in response to detecting that the overlap of the first image and the second image is for a first period of time, to form a merged folder, which includes both the first image and the second image, and
  a second operation detected at the merged folder, which is a long press selection, that causes the processor to sequentially move a third image and a fourth image, among the plurality of images, towards the merged folder in a second direction opposite to the first direction,
wherein the first image, the second image, the third image and the fourth image are displayed in a row on the display,
wherein the long press selection is detected when the merged folder remains touched for a second period of time continuously and uninterrupted from the first period of time at the same position at which the merged folder is formed where overlap of the first image and the second image was detected,
wherein the sequential movement of the third and the fourth images toward the merged folder continues as long as the long pressing selection continues, and
wherein the third image is merged into the merged folder and thereafter the fourth image is merged into the merged folder in sequential order, if the long pressing selection continues until the third image and the fourth image have overlapped the merged folder, such that the merged folder contains all the first, second, third and fourth images after the long press selection.

6. The image display control method according to claim 5, wherein the input at the first image comprises a touch input.

7. The image display control method according to claim 5, wherein the drag gesture further comprises a touch input.

8. A non-transitory computer readable medium storing a program causing a computer to execute a process, the process comprising:
detecting an input operation at a first image, among a plurality of images displayed on a display; the input operation comprising:
  a first operation, which is a drag gesture, which causes a processor of the computer to move the first image towards a second image, among the plurality of images, in a first direction, and integrate the first image and the second image, in response to detecting that the overlap of the first image and the second image is for a first predetermined period of time, to form a merged folder, which includes both the first image and the second image; and
  a second operation detected at the merged folder, which is a long press selection, that causes the processor to sequentially move a third image and a fourth image, among the plurality of images, towards the merged folder in a second direction opposite to the first direction,
wherein the first image, the second image, the third image and the fourth image are displayed in a row on the display,
wherein the long press selection is detected when the merged folder remains touched for a second period of time continuously and uninterrupted from the first period of time at the same position at which the merged folder is formed where overlap of the first image and the second image was detected,
wherein the sequential movement of the third and the fourth images toward the merged folder continues as long as the long pressing selection continues, and wherein the third image is merged into the merged folder and thereafter the fourth image is merged into the merged folder in sequential order, if the long pressing selection continues until the third image and the fourth image have overlapped the merged folder, such that the merged folder contains all the first, second, third and fourth images after the long press selection.

\* \* \* \* \*